United States Patent [19]
Chang et al.

[11] Patent Number: 4,820,681
[45] Date of Patent: Apr. 11, 1989

[54] PREPARATION OF HYDROPHOBIC CARBON MOLECULAR SIEVES

[75] Inventors: Chin-Hsiung Chang, Palatine; Gary J. Seminara, Chicago, both of Ill.

[73] Assignee: Allied-Signal Inc., Morristown, N.J.

[21] Appl. No.: 137,684

[22] Filed: Dec. 24, 1987

[51] Int. Cl.$^4$ .................. C01B 31/02; C01B 31/00; B01J 20/20; B01J 21/18

[52] U.S. Cl. .................. 502/418; 55/68; 55/74; 55/75; 264/29.1; 264/29.6; 423/445; 423/449; 502/180; 502/416; 502/437

[58] Field of Search .............. 502/416, 418, 420, 436, 502/437, 180, 181; 423/445, 449; 264/29.1, 29.6, 29.7

[56] References Cited

U.S. PATENT DOCUMENTS

| | | | |
|---|---|---|---|
| 3,960,768 | 6/1976 | Ripperger et al. | 252/444 |
| 4,046,709 | 9/1977 | Yuki | 252/421 |
| 4,420,415 | 12/1983 | Yuki et al. | 502/180 |
| 4,540,678 | 9/1985 | Sutt, Jr. | 502/5 |
| 4,627,857 | 12/1986 | Sutt, Jr. | 55/70 |
| 4,629,476 | 12/1986 | Sutt, Jr. | 55/68 |
| 4,775,655 | 10/1988 | Edwards et al. | 502/418 |

FOREIGN PATENT DOCUMENTS

| | | | |
|---|---|---|---|
| 0223574 | 5/1987 | European Pat. Off. | 502/437 |
| 191213 | 11/1982 | Japan | 502/437 |

OTHER PUBLICATIONS

Flanigen, E. M. et al., "Silicalite, a new hydrophobic crystalline silica molecular sieve," Nature, vol. 271 Feb. 9, 1978, pp. 512-516.

*Primary Examiner*—Paul E. Konopke
*Attorney, Agent, or Firm*—Harold N. Wells; Thomas K. McBride; John F. Spears, Jr.

[57] ABSTRACT

A method is described for producing hydrophobic carbon molecular sieves. The method does not employ a binder to form or shape previously carbonized materials. Instead, a cross-linked oxygen-free polymer is first produced. Fine particles of this polymer are then pelletized or shaped as by simple extrusion. The extruded pellets are then carbonized in an oxygen-free atmosphere to yield binderless homogeneous particles of similar shape comprised of carbon sieves.

7 Claims, No Drawings

PREPARATION OF HYDROPHOBIC CARBON MOLECULAR SIEVES

BACKGROUND OF THE INVENTION

The subject invention relates to a method of making shaped particles comprising at least 99 wt.% carbon. The materials manufactured by the subject method may be utilized in various separation and adsorption processes. The subject invention is specifically directed to a method of manufacturing carbon molecular sieves.

Porous carbon-based materials have found a broad range of uses as adsorbents for treating various materials and as adsorbents employed in separation processes. This utility has led to a significant amount of activity in developing methods to produce better carbon molecular sieves as represented by the references cited below and the material referred to in these references.

U.S. Pat. Nos. 4,540,678; 4,627,857; and 4,629,476 issued to R. F. Sutt, Jr. are believed relevant for their general teaching in regard to the preparation of carbon molecular sieves. These references describe the preparation of carbon molecular sieves from carbon sources such as coal or coconut char. The references also indicate that it is known to produce the sieves by treating the feed material in a substantially oxygen-free environment during a heating or calcining step. According to these references, the pore distribution may be adjusted through the use of a pore blocking substance such as a large molecular weight hydrocarbon although this material is not employed in all embodiments described in these three references.

U.S. Pat. No. 4,046,709 issued to N. Yuki and 4,420,415 issued to N. Yuki et al. are believed relevant as they describe the production of carbon molecular sieves from polymeric precursor materials similar to that which may be employed in the subject invention. These references describe the utilization of a vinylidene chloride copolymer as a precursor material. The copolymer is carbonized for the removal of its chlorine and hydrogen components and the resultant char is pulverized. Sintering agents such as coal tar pitch and binder materials such as cellulose are then added to pulverized product and the mixture is shaped. The thus shaped bound material is then subjected to a high temperature carbonizing treatment to yield the finished material.

U.S. Pat. No. 3,960,768 issued to W. Ripperger et al. is also believed relevant for its teaching in regard to the production of carbon molecular sieves from polymerized halohydrocarbons by the elimination of hydrogen halide during a heating procedure. The reference indicates appropriately shaped end products can be obtained by using raw materials having a corresponding shape. The teaching at column 3 of this reference indicates the preshaped starting materials shrink into the corresponding shapes.

The last cited reference teaches a specific method of heating the polymer in order to avoid the problem associated with the prior methods. More specifically, in the prior methods such as that of U.S. Pat. No. 4,420,415 cited above the polymer would tend to produce a foam-like highly porous carbon upon heating and removal of hydrogen chloride. The resultant material was too soft and porous to be utilized effectively in commercial applications. For this reason, it is necessary to grind the foam-like powder and employ a binder to form articles having a desired finished shape.

There have been references in the literature to carbon molecular sieves which have a hydrophobic nature. For instance, this is described in the article at page 512 of Volume 271 of Nature (1978) by E. M. Flannigen et al.

BRIEF SUMMARY OF THE INVENTION

The subject method provides a carbon molecular sieve material exhibiting excellent selectivity for carbon dioxide over nitrogen and oxygen. The carbon molecular sieve produced by the subject invention is highly hydrophobic and therefore its selectivity for $CO_2$ over nitrogen or oxygen remains high despite the presence of high concentrations of water. This hydrophobic nature of the resultant material is believed to be a unique property not present in carbon molecular sieves produced by the prior art methods.

One broad embodiment of the invention may be characterized as a method of manufacturing binderless particles comprising hydrophobic carbon molecular sieves which comprises polymerizing a cross-linking agent and a precursor monomer, with both the cross-linking agent and the monomer being essentially free of molecular oxygen, and producing free flowing granules of a cross-linked polymer; pelletizing a quantity of the granules into a pellet having a desired configuration without employing a binder material; and, carbonizing the resultant shaped pellet into a finished molecular sieve particle having the same overall shape as the pellet. The unique characteristics of the material produced by the subject method are obtained without any posttreatment of the material produced in the carbonizing step.

DETAILED DESCRIPTION

Extensive work has been done to develop useful carbon-based materials having relatively uniform pore size distribution and the required adsorptive surface properties to allow these carbon-based materials to function as carbon molecular sieves (CMS). These materials may be thought of as analogs to the more conventional inorganic molelcular sieves and have been found to be selective for the separation of one normally gaseous compound or molecule from another. Typical of the materials which are selectively adsorbed by these materials are carbon dioxide, hydrogen sulfide, and oxygen. The references cited above are indicative of the variety of feed materials, preparation methods, and surface coating methods which have been employed in the art to obtain the desired specific pore structure and surface characteristics which impart either a broad spectrum or selective adsorptive property to the resultant materials.

It is believed, however, that the materials produced according to the methods of the prior art do not exhibit a unique combination of a hydrophobic characteristic coupled with an adsorption capacity for carbon dioxide which would allow these materials to be readily employed as highly efficient means for removing carbon dioxide from a moist gas stream. It is also believed that the manufacturing techniques described in the majority of the references hinder the full utilization of the adsorptive capacity of the sieve by leading to an unhomogeneous nature of the resultant finished product and that the manufacturing techniques of the prior art can be improved to reduce the cost of producing the desired material. CMS materials made by prior art methods from waste materials from the manufacture of Saran or other low cost feedstocks have not been optimized for the desired properties of the subject CMS materials. It is therefore an objective of the subject invention to provide a method of producing a hydrophobic carbon molecular sieve. It is a further objective of the subject invention to provide a carbon-based molecular sieve capable of removing carbon dioxide from a moist gas stream. It is a further objective of the subject invention to provide a method of manufacturing carbon molecular sieves which does not require the grinding of carbonized materials or admixture of a binder or other material into the sieve precursor material.

In the subject invention, hydrophobic carbon molecular sieves selective (CMS) for the adsorption of carbon dioxide in a moist atmosphere are produced by a unique method of manufacturing. This novel method of manufacturing may be broadly characterized as comprising three steps: (1) polymerization of an oxygen-free monomer in the presence of an oxygen-free cross-linking agent; (2) forming or shaping particles of the resultant polymer into a desired shape; and then, (3) carbonizing the shaped material in a substantially oxygen-free environment. This method of manufacturing therefore comprises the steps of polymerizing a cross-linking agent and a precursor monomer, with both the cross-linking agent and the monomer being essentially free of molecular oxygen, and producing a cross-linked polymer; shaping a quantity of the polymer into an article having a desired configuration without employing a binder material; and, carbonizing the resultant shaped article in a substantially oxygen-free environment into a finished product comprising carbon molecular sieves and having the same overall shape as the uncarbonized article but with reduced dimensions.

The monomer employed in the subject invention can be chosen from a number of different monomers which have general characteristics rendering them suitable for the subject method. Basically, they should be readily polymerizable, essentially free of oxygen in their molecular structure and preferably comprised basically of hydrogen, a halogen, and carbon. Among the materials which may be employed as the monomer are acrylonitrile (AN), vinylidene fluoride (PVDF), chlorotrifluoroethylene (HALAR), vinylidene chloride (PVDC), mixtures of two or more monomers such as mixtures of vinylidene chloride and vinyl chloride, vinylidene chloride and acrylonitrile, and a mixture of styrene and divinylbenzene. Other monomers which are suitable for utilization in the subject invention are vinyl fluoride, vinyl bromide, chlorinated ethylene, chlorofluoroethylene, vinyl chlorobenzene, vinylidene bromide and vinylidene-fluoride-chlorotrifluoro-ethylene. The preferred monomer for utilization in the subject invention is vinylidene chloride.

Polymerization reactions may be performed according to a number of different procedures known in the art. However, it has been found that a surprising relationship exists between the method of polymerization employed in the subject process and the adsorptive characteristics of the resultant material. The most favorable results have been obtained employing a bulk polymerization or a solution polymerization.

As used herein the various types of polymerization will be defined in terms of the description found in Volume 16 of the second edition of the *Kirk-Othmer Encyclopedia of Chemical Technology*. Accordingly, a bulk polymerization is the direct conversion of liquid monomer to polymer in a reaction system in which the polymer remains soluble in its own monomer. To deal with the problems of removing the exothermic heat of polymerization this type of polymerization is often terminated at relatively low conversions of 40-60 percent and excess monomer drained and distilled off for use in a subsequent polymerization. Solution polymerization is considered herein to be a method wherein a solvent is used which is capable of dissolving the monomer, the polymer, and the polymerization initiator.

Suspension polymerization and emulsion polymerization did not produce materials having the same level of desired properties and therefore are less preferred methods of polymerization. In suspension polymerization, the monomer is dispersed rather than dissolved in the medium with water being a typical suspension medium. In suspension polymerization, the initiator is dissolved in the monomer, the monomer is dispersed in water, and a dispersing agent is incorporated to stabilize the suspension formed. The monomer droplets are generally on the order of approximately 0.1-1.0 millimeter in size. In emulsion polymerization, the polymerization is within a suspended particle of colloidal size of approximately 50 to 1500 Angstroms in diameter. The initiator is normally found in the aqueous phase and not within the monomer. It is believed that precipitation polymerization and vapor phase polymerization would also be suitable for the subject process.

As shown in Tables 2 and 4 below, the carbon molecular sieves prepared from bulk and solution polymerized precursors were hydrophobic whereas the precursors synthesized with various emulsion and suspension formulations produced carbon molecular sieves with hydrophilic characteristics. It is believed adjustment of the methods used to perform the emulsion and suspension polymerizations may result in the production of hydrophobic molecular sieves. The mechanism which causes the performance of the finished sieve to be dependent upon the method of polymerization employed is not understood. However, it is speculated that these differences may result from the inclusion within the polymer and therefore possibly within the finished molecular sieve of remnants the materials required to form the suspension or added to the suspension for a number of purposes such as surfactants added to aid in the production of a desired emulsion.

The polymers produced in the initial polymerization step should be cross-linked with a substantially oxygen-free cross-linking agent. The cross-linking agent will typically be present during the polymerization at a concentration equal to less than 10 mole percent of the monomer. A preferred cross-linking agent is divinylbenzene. Other cross-linking agents which are contemplated for use in the subject method include trivinyl benzene, divinyl acetylene, and divinyl sulfide.

As the production of carbon molecular is desired, from polymers having a no-oxygen functionality is desired, the polymerization initiator is also preferably an oxygen-free compound. Therefore, a carbon or azo rather than an oxygen initiator is preferably used. One suitable nonoxygen containing initiator is 2,2'-azobis-(isobutyronitrile), (AIBN), which has a molecular formula of $C_8H_{12}N_4$. Another highly suitable polymerization initiator is the compound 2,2'-azobis (2,4-dimethylvaleronitrile) which is available from DuPont Chemical Company and is sold under the trade VAZO 52. The formula of the latter compound is $C_{14}H_{24}N_4$. If the precursor polymer is produced by solution polymerization, a number of different solvents may be employed. Typical solvents include normal hexane, chloroform, carbon tetrachloride, orthodichlorobenzene, and 1,1,2,2-tetrachloroethane. Of these materials, orthodichlorobenzene and 1,1,2,2-tetrachloroethane appear to be preferable as they resulted in higher polymer yields. General characteristics for the selection of a solvent include a high-solubility for the monomer, the absence of oxygen from the molecular structure, and a large difference in boiling point between the solvent and the monomer. A weight ratio between monomer and solvent between 1:1 to 1:2 will normally be suitable.

The material formed by the polymerization may be obtained in a number of different forms such as one or more large masses formed within a reactor or large number of smaller particles. For ease in fabricating the polymer into a desired shape, it is preferably pulverized, shredded, or in some way reduced in size to small free-flowing granules or powder. These granules or even the bulk material resulting from the initial polymerization is then shaped or formed into a desired configuration such as a cylinder, sphere, rod, flat sheet, porous or perforated sheet, extruded honeycomb or monolith, pellets, etc. This shaping or forming may be done by conventional means according to a number of different methods. For instance, the powder may be put into a press and pressurized until it will retain a desired shape. Alternatively and preferably, the resultant material is warmed and extruded into a desired form, with cylinders having a length to diameter ratio above 1.5 being a highly preferred form.

The shaped polymeric material is subjected to a carbonization procedure. This procedure basically consists of heating the shaped material to a high temperature in the presence of an inert gas such as nitrogen or helium. This carbonization is performed in an essentially oxygen-free environment. That is, the concentration of oxygen in the atmosphere surrounding the particles undergoing carbonization should be less than 0.1 mole percent and is preferably less than 0.05 mole percent. The carbonization will result in the evolution of a hydrogen halide. Preferably the inert gas should be flowing at a sufficient rate to remove this material from the particles. However, it has been found that the removal of the halogen halide is not necessary to the production of suitable finished material by the subject method. It is preferred that prior to high temperature carbonization the shaped polymer precursor material is subjected to a mild heating step during which its temperature is raised above 150° C. and that the pellet is held at this temperature until no more weight loss occurs. The pellets or other form of shaped material is then preferably subjected to a programmed temperature increase to a temperature above 700° Celsius and preferably above 800° Celsius. A temperature of or about 900° Celsius is highly preferred. The temperature of the shaped precursor material is preferably raised at a rate greater than 50 Celsius degrees per hour but less than 200 Celsius degrees per hour. Also, it is preferred to hold the shaped material at the final high temperature, such as 800 degrees, for a period of at least 45 minutes and preferably for at least one hour. A preferred rate of programmed heating is a heat increase rate of 75–125 Celsius degrees per hour. The highest temperature is normally required for less than 5 hours. The required holding period can be determined by weight loss measurements.

One characteristic of the subject method is that it requires only a single carbonization step. That is, the second carbonization step of some prior art methods is not required. The second carbonization step of the prior art occurs after the product of the first carbonization has been pulverized, admixed with a binder or other material such as coal tar pitch or other heavy high carbon content material and then shaped. The second carbonization basically acts upon the binder material.

Another characteristic feature of the subject invention is that the sieve precursors are derived from polymeric materials which are substantially free of the inorganic materials such as metals and inorganic oxides which may be present when the precursor material is made from a naturally occurring substance such as coal, coconut shells, peat, or wood. Materials which also contain a binder prior to carbonization will normally have impurities derived from the binder in addition to impurities present in the precursor materials. After carbonization, the subject materials, on a hydrogen-and oxygen-free basis, should contain at least 99.5wt.% carbon and preferably at least 99.8wt.% carbon. This measurement does not include any material applied as a surface treatment or coating.

The shaped mass of polymeric material will shrink during the carbonization step. It has been found that the shaped material will tend to shrink in a proportional manner along each dimension. The amount of shrinkage is also proportional to the amount of weight loss caused by the driving off of the hydrogen halide from the shaped polymer. The shaped pellet will lose approximately 70 percent of its weight and size during the carbonization procedure due to the evolution of hydrogen chloride, hydrogen bromide, or hydrogen fluoride or a mixture of these gases. A minimum weight loss of 60 percent is desirable. As shown in the tables herein, the final carbonized material will often equal about 27 to 28 weight percent of the initial or starting polymerized material. Table 1 gives detailed data on the shrinkage experienced by a number of different samples.

It is interesting to note that the density of the initial material and the final carbonized material are very similar. That is, the density measured in terms of grams per milliliter of the finished carbon molecular sieves is normally within 0.05 grams per milliliter of the density of the initial uncarbonized polymer. Samples A-1 through C-4 were from a bulk polymerization, with the uncarbonized pellets of samples A-1 to B-6 having a diameter of 0.64 cm (0.25 in) prior to carbonization. The pellets of sample group C had an initial diameter of 0.32 cm. The precursor powder used to form the pellets was ball-milled for 3 hours for samples A-1 to A-4, while the powder used to produce samples B-1 to B-6 were ground in an electric blender. After the carbonization step is finished the preparation of the subject CMS material is complete. It is not necessary to apply a surface coating or other treatment to the carbonized material as to adjust pore opening sizes or shapes.

TABLE 1

CARBONIZATION OF PVDC-DVB PELLETS AT 900 C.

| Sample Number | STARTING PELLETS | | FINAL CMS PELLETS | | |
|---|---|---|---|---|---|
| | Wt (g) | Density (g/mL) | Wt (g) | Density (g/mL) | Yield (%) |
| A-1 | .1659 | 0.953 | .0457 | 0.952 | 27.5 |
| A-2 | .1686 | 0.953 | .0466 | 0.951 | 27.6 |
| A-3 | .1710 | 0.983 | .0473 | 0.965 | 27.7 |
| A-4 | .1330 | 0.964 | .0366 | 1.017 | 27.5 |
| B-1 | .1426 | 0.779 | .0386 | 0.757 | 27.1 |
| B-2 | .1358 | 0.813 | .0368 | 0.767 | 27.1 |
| B-3 | .1242 | 0.839 | .0337 | 0.864 | 27.1 |

TABLE 1-continued

CARBONIZATION OF PVDC-DVB PELLETS AT 900 C.

| Sample Number | STARTING PELLETS | | FINAL CMS PELLETS | | |
|---|---|---|---|---|---|
| | Wt (g) | Density (g/mL) | Wt (g) | Density (g/ML) | Yield (%) |
| B-4 | .1441 | 0.787 | .0391 | 0.782 | 27.1 |
| B-5 | .1493 | 0.816 | .0403 | 0.822 | 27.0 |
| B-6 | .1312 | 0.754 | .0355 | 0.740 | 27.1 |
| C-1 | .0377 | 0.820 | .0100 | 0.769 | 26.5 |
| C-2 | .0348 | 0.829 | .0093 | 0.715 | 26.7 |
| C-3 | .0364 | 0.791 | .0096 | 0.800 | 26.4 |
| C-4 | .0365 | 0.830 | .0097 | 0.808 | 26.6 |

EXAMPLE 1

This example illustrates the production of CMS pellets beginning with the bulk polymerization of a cross-linked polyvinylidene chloride. The reagents utilized in the polymerization were purified by contact with activated carbon (Calgon PCB, 20×50 mesh) at the ratio of 2 grams activated carbon per 100 milliliter of the monomer and the divinyl benzene. The purpose of this purification is the removal of any polymerization inhibitors present in the monomer or cross-linking agent. 0.1 gram of AIBN solids were introduced into a Teflon-lined reactor, which was a 125 milliliter Parr bomb. 82.4 milliliters of vinylidene chloride monomer in 1 milliliter divinylbenzene were transferred into the reactor and the reactor was sealed and shaken. The reactor was then kept in an oven at 70° Celsius for a period of at least 8 hours. At the end of this time, the reactor was opened in a hood and the polymer products were collected and weighed. The yield of polymerization reaction product was determined after the polymer was evacuated in the hood until a constant weight was obtained. All of the results listed herein as being from a bulk polymerization are based on the utilization of this general procedure for the polymerization step. The only variations would be in the monomer, or cross-linking agent employed, the composition of the initiator, or the purification of the reactants with a carbon column of about 1.5 centimeters diameter packed with 8 grams of adsorbent.

The polymer produced in this manner was then pulverized with an electric blender. Pellets of 3.2, 4.2, and 6.4 millimeter diameters were made with a handpress.

After being shaped by the pelletization procedure, the pellets were carbonized in a rotating reactor with a programmed heating rate. The pellet to be carbonized was heated in a one-inch diameter quartz tube placed in a tube furnace. A steady stream of inert gas was introduced into the quartz tube for at least 30 minutes prior to the heating of the furnace. The temperature of the furnace was increased at a constant rate from room temperature to final temperature. A heating rate of 110 Celsius degrees per hour was used with the final temperature of 900 degrees Celsius being held for one and one-half hours before the product was allowed to cool to room temperature. It is believed important that a dry inert gas flows through the furnace during carbonization or that an atmosphere sealed into the furnace during carbonization is essentially free of oxygen. The inert gas may be nitrogen or helium. The amount of cross-linking material present was 0.9 and 0.5 weight percent in various tests. The finished carbon molecular sieves produced at these two levels were quite similar, and a DVB level of 0.5 weight percent was adopted as a standard.

EXAMPLE 2

This example illustrates the preparation of the polymer using solution polymerization. A 125 milliliter Parr bomb as described in the previous example was used. The total volume of reagents in the reactor was maintained at about 85 milliliters. The ratio of vinylidene to solvent was maintained at 1:1.5 with the solvent being orthodichlorobenzene. The reactor was held at 70° Celsius for 21 hours. A polymer yield of 50.9 weight percent was obtained, with the solvent being removed from the polymer products by a vacuum ($10^{-3}$ mm mercury) until a constant weight was obtained. The material was then pulverized, shaped and carbonized as described in Example 1. Prior polymerizations with n-hexane, chloroform and carbontetrachloride yielded 7.2, 14.2 and 19.6 wt.% yields respectively.

A second solution polymerization was performed using 1,1,2,2-tetrachloroethane at a ratio of vinylidene chloride to solvent of 1:2. The reaction was continued for 16 hours at a temperature of 70°. The polymer yield was approximately 47.9 weight percent. This material is characterized in the accompanying tables as sample 3. The same general procedure used in the Example 1 for the purification of the monomer and cross-linking agent were followed for the solution polymerization trials.

EXAMPLE 3

Polymeric materials were produced using emulsion polymerization techniques. In this test run, 43.7 grams of vinylidene chloride was admixed with 0.9 g of divinylbenzene cross-linking agent. Both of these materials had been purified as previously described. This admixture was added to 137.8 g of a mixture containing 1.35 g of ammonium sulfate, 0.67 g of hydrazine sulfate, 0.81 g of sodium hydroxide and 135 g of distilled water which formed the continuous phase during the polymerization. 0.45 g of sodium lauryl sulfate was added to aid in formation of the emulsion. This admixture was maintained in a rapidly agitated 500 milliliter reactor maintained at a temperature of 25 degrees Celsius for 24 hours. The polymeric material was pulverized, pressed into pellets and carbonized in accordance with procedure described in Example 1. The material produced in this manner comprises the sample labeled as sample number 5 in the tables.

The above examples are not intended to present the only methods of preparing the material of the subject invention or to otherwise limit the scope of the invention. The examples are intended to aid in describing and facilitating the production of the CMS materials of the invention.

EXAMPLE 4

The CMS material used in the subject process is believed to have a number of unique adsorptive properties. This example is presented to illustrate this point and to help characterize the preferred CMS material. The static equilibrium capacity for carbon dioxide adsorption of the carbon molecular sieves produced in the Examples above was determined by weight difference at room temperature. The weight measurements were made using a gravametric McBain balance. This system consists of a quartz spiral spring, a gas supply system, and a high vacuum system. The spring is contained in a quartz tube with the carbon molecular sieves contained in a quartz basket hung from the end of the spring. The extension of the spring could be measured to plus or minus 0.05 millimeters. About 100 milligrams of finished carbon molecular sieves were evacuated and heated to 200° Celsius for a period of more than one hour until a constant weight was obtained. During this time the pressure of the balance system was monitored. The adsorption measurement was carried out after the adsorbent in the quartz spring were cooled to room temperature under vacuum. Air was then introduced into the absorption chamber, with the air having been adjusted to contain $CO_2$ at 0.4 or 0.5 mole percent concentrations. The air had been dried prior to utilization in this experiment.

The data obtained in this manner is listed in Table 3. As may be seen by reference to the table, the $CO_2$ adsorption capacity of the different carbon molecular sieves is quite similar although the materials prepared by the bulk polymerization have a higher capacity than those prepared by solution or emulsion polymerization methods.

TABLE 2

GAS-SOLID CHROMATOGRAPHIC EVALUATION OF CARBON MOLECULAR SIEVES

| Sample No. | Polymerization Method | Pellet Density (g/ml) Before | Pellet Density (g/ml) After | Carbon Yield (%) | Column Packing Density (g/mL) |
|---|---|---|---|---|---|
| 1 | Bulk | 0.80 | 0.78 | 27.0 | 0.48 |
| 2 | Bulk | — | — | — | 0.43 |
| 3 | Solution | 0.62 | 0.90 | 26.6 | 0.45 |
| 4 | Solution | — | — | — | 0.40 |
| 5 | Emulsion | 0.75 | 1.00 | 26.5 | 0.49 |
| 6 | Emulsion | — | 0.91 | 24.4 | 0.56 |
| 7 | Emulsion | 1.05 | 0.99 | 26.7 | 0.36 |
| 8 | Emulsion | 0.88 | 0.36 | 28.2 | 0.19 |
| 9 | Emulsion | 0.65 | 0.31 | 28.3 | 0.21 |
| 10 | Emulsion | — | — | 11.3 | 0.35 |
| 11 | Emulsion | 0.67 | 0.96 | 26.0 | 0.31 |
| 12 | Emulsion | — | — | 26.7 | 0.50 |
| 13 | Suspension | — | — | 26.4 | 0.54 |
| 14 | — | — | — | — | 0.63 |

TABLE 3

| Sample No. | Pellet Diameter (cm) | Preparation Method | Bulk Density (g/mL) | Carbon Yield (%) | $CO_2$* Capacity (g/g) |
|---|---|---|---|---|---|
| 15 | 0.42 | Bulk | 0.60 | 26.4 | 0.0246 |
| 16 | 0.21 | Bulk | 0.77 | 26.6 | 0.0259 |
| 17 | 0.42 | Solution | 0.65 | 23.4 | 0.0234 |
| 3 | 0.19 | Solution | 0.90 | 26.6 | 0.0236 |
| 18 | 0.42 | Emulsion | 0.75 | 25.6 | 0.0217 |
| 5 | 0.37 | Emulsion | 1.00 | 26.5 | 0.0223 |

*Data taken with 0.4% $CO_2$ in air at room temperature.

EXAMPLE 5

The selectivity of the carbon molecular sieves for carbon dioxide as compared to nitrogen or oxygen and the hydrophobicity of the carbon molecular sieves was studied with a gas-solid chromatographic method. A Hewlett-Packard Model 5890A gas chromatographic unit equipped with a thermal conductivity detector was employed. The column of the chromatographic unit was a stainless steel tube with a 1.5 millimeter ID having an adsorbent volume of 1.5 milliliter. Pellets of the finished carbon molecular sieves were sized to 0.21–0.42 millimeter in diameter. These small particles were then packed into the column. The column temperature was controlled by an oven.

During the test helium is introduced into the column continuously at a flowrate of 20.0 milliliters per minute. This flowrate corresponds to a gas hourly space velocity of approximately 800. After the system has been lined out and a constant baseline signal is achieved at the detector, a known volume of a sample gas is introduced. The volume was controlled by a sampling valve on the chromatographic unit or by a precision gas syringe. The volume of the $CO_2$ gas mixture injected was 0.1 milliliter. The sample gas was followed by a continuous flow of helium.

During passage through the absorption column, the various components of a gas (nitrogen, oxygen or carbon dioxide) will distribute themselves between the adsorbent phase and the gas phase. The more strongly adsorbed material would tend to move towards the exit of the column at a slower rate than a less strongly adsorbed component. By detecting the signals corresponding to the various components as they exit the column, the selectivity of the particular carbon molecular sieve may be monitored.

The selectivity of the carbon molecular sieve for carbon dioxide over moisture was determined by measuring the retention time of water under similar conditions as used for the carbon dioxide. Therefore, a small quantity of water is injected into the carrier gas and the retention time was compared to that of carbon dioxide in a nitrogen/oxygen mixture. Referring now to Table 4, it may be seen that for sample number 1 the retention time for carbon dioxide was 2.88 minutes while the retention time under the same chromatographic conditions for water was 1.95 minutes. These results indicate that the carbon molecular sieve of sample number 1 is selective for carbon dioxide over water. That is, it is hydrophobic under these conditions. It may be seen that the samples 1–4 prepared by bulk and solution polymerization have ratios of carbon dioxide to water retention times greater than one.

The carbon molecular sieves prepared by emulsion and suspension polymerization techniques (samples 5–13) are shown to be hydrophilic. That is, these materials preferred to retain water over carbon dioxide. The material labeled as sample 14 is a commercially available carbon molecular sieve marketed by Supelco under the tradename Carbosiev S-II.

The carbon molecular sieve material produced by the subject method would normally have a finished, that is after carbonization, density ranging from 0.7 to 1.05 grams per milliliter. This is the piece density or the density of the solid material. The column packing density or the density at which this material may be packed into an adsorptive chamber will be dependent upon the shape of the finished molecular sieve particle. The column packing density for pellets having a cylindrical shape will normally be between 0.3 and 0.6 grams per milliliter. The carbon molecular sieves produced by the subject method are expected to generally have physical characteristics similar to that of the prior art carbon molecular sieves. The average pore volume is expected to be between 0.4 and 0.8 cc per gram. Based on comparison tests using different sized adsorbed species, it appears the average pore opening for carbon molecular sieves is on the order of 5 Angstroms. The subject materials have an average surface area of about 1000 to 1200 $m^2$ per gram. Although the materials made by the subject method may have physical characteristics similar to those materials made by prior art methods, it is believed they have unique chemical surface or adsorptive properties. These unique properties include the above described ability to selectively retain carbon dioxide in preference to water thereby allowing the removal of carbon dioxide from a water-containing stream of gas such as air.

The materials produced by the subject invention may be utilized for the purification of air in a number of enclosed environments or vehicles. Specifically, the subject material is expected to find utility in the removal of carbon dioxide from breathing air. It may be employed in an airplane or other vehicle to maintain a low level of carbon dioxide or to capture the carbon dioxide for further processing. The hydrophobic nature of the sieve prepared according to the subject invention allows this carbon dioxide removal to be achieved without the prior passage of the air being treated through a bed of material or other system for the removal of normally expected amounts of water vapor. Carbon dioxide removal from air may be accomplished by passing the air at a slight pressure or at an ambient pressure through an active bed of the subject material maintained at adsorption-promoting conditions. Two or more beds may be employed on a swing bed system to provide continuous removal of carbon dioxide. The adsorbed carbon dioxide may then be recovered from the subject molecular sieves by conventional means such as by depressurization, heating, or a combination of these two methods which regenerates the material and returns it to an active or unsaturated form.

TABLE 4

| Sample No. | Retention Time (at 110° C.) | | | |
|---|---|---|---|---|
| | $N_2$ | $CO_2$ | $H_2O$ | $CO_2/H_2O$ |
| 1 | 0.56 | 2.88 | 1.95 | 1.67 |
| 2 | 0.32 | 1.71 | 1.20 | 1.58 |
| 3 | 0.39 | 2.12 | 1.61 | 1.42 |
| 4 | 0.39 | 2.05 | 1.27 | 1.88 |
| 5 | 0.39 | 2.17 | 3.77 | 0.51 |
| 6 | 0.52 | 3.02 | 6.21 | 0.44 |
| 7 | 0.34 | 1.60 | 2.60 | 0.56 |
| 8 | 0.37 | 1.27 | 15.10 | 0.06 |
| 9 | 0.27 | 1.80* | 7.10* | 0.22 |
| 10 | 0.32 | 1.80* | 6.20* | 0.25 |
| 11 | 0.39 | 1.69 | 2.21 | 0.71 |
| 12 | 0.37 | 2.22 | 4.05 | 0.50 |
| 13 | 0.31** | 1.32** | 7.0** | 0.15 |
| 14 | 0.31 | 1.30 | 6.50 | 0.16 |

*Broad peaks.
**Data taken at 140° C.

What is claimed:

1. A method of producing shaped products comprising a homogeneous hydrophobic molecular sieve material which comprises the steps:
   (a) performing a bulk or solution polymerization of an oxygen-free monomer in the presence of 0.5-0.9 wt. percent of an oxygen-free cross-linking agent, and producing free flow granules of a cross-linked polymer;
   (b) producing shaped articles from a quantity of said granules without a binder material; and,
   (c) carbonizing the resultant shaped articles in an oxygen-free environment in the presence of an inert gas into shaped products having a density of 0.7-1.05 gm/ml and an average pore volume of 0.4-0.8 cc/gm.

2. The method of claim 1 further characterized in that the monomer is vinylidene chloride.

3. The method of claim 1 further characterized in that the article is held at a temperature above 800 degrees C. for at least one hour during the carbonization step.

4. The method of claim 3 further characterized in that the weight of the article is reduced by at least 60 percent during the carbonization step.

5. The method of claim 3 further characterized in that the monomer comprises a halogen.

6. The method of claim 4 further characterized in that the monomer is a vinyl chloride monomer.

7. The method of claim 4 further characterized in that divinyl benzene is employed as the cross-linking agent.

* * * * *